Figure 1:
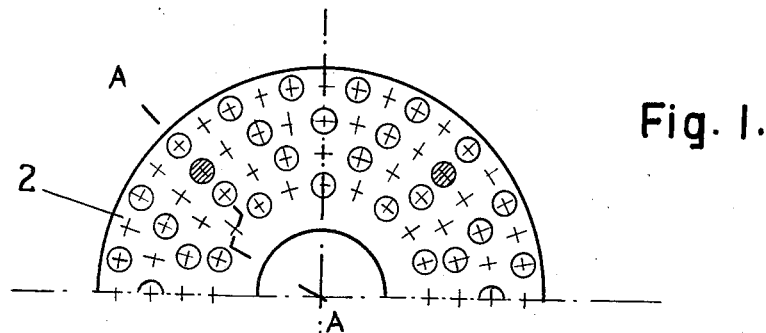

Oct. 5, 1954

A. SELIGMAN 2,690,763

COMPRESSOR VALVE

Filed May 24, 1949

2 Sheets-Sheet 1

Arthur Seligman
INVENTOR.

Oct. 5, 1954  A. SELIGMAN  2,690,763
COMPRESSOR VALVE

Filed May 24, 1949  2 Sheets-Sheet 2

INVENTOR.
Arthur Seligman

Patented Oct. 5, 1954

2,690,763

UNITED STATES PATENT OFFICE 2,690,763

COMPRESSOR VALVE

Arthur Seligman, Newark, N. J.

Application May 24, 1949, Serial No. 95,050

2 Claims. (Cl. 137—516.11)

This invention relates to automatic non-return valves, that is valves which allow the flow of a fluid in one direction but prevent back-flow, and are governed by suitable means, e. g. springs, within the valve itself, thus not requiring any actuation from outside. The invention is particularly intended for valves which have to operate very fast, such as the suction and discharge valves in high speed compressors and pumps. The following description refers, therefore, to compressor valves; the principle may, however, be used for other applications where similar conditions prevail, such as check valves in gas lines.

The well-known ring plate valves hitherto usual for this purpose consist of a valve seat, provided with slots for the passage of the gas, which are preferably arc-shaped and arranged on one, or several concentric circles; these slots are covered by ring-shaped plates; the plates are held in place by the guard, which also has arcual slots, staggered against those in the seat; in most cases one or several springs are provided, which are located in suitable spring wells within the guard and rest upon the plates, thus keeping the valve closed unless the force of the gas pressure on the upstream side exceeds the spring load and opens the valve; finally some means, usually one or several screw bolts are provided to hold the whole assembly properly together.

Instead of arcual slots with a few ribs between them sometimes a great number of round holes are used, located on one, or several concentric, pitch circles, the circles on the seat staggered to those on the guard. Holes are cheaper to manufacture, but, with this usual arrangement, do not provide as much effective area as slots.

The main object of the invention is to combine the easy manufacture of drilled holes with an area equal to, or even larger than, that hitherto obtainable only with slots.

The main characteristic of the invention is that round holes are provided in the seat and, in approximately equal number and size, in the plate and guard as well, that those in the plate and guard register with each other but not with those in the seat, and that, contrary to the usual arrangement, the holes in the seat alternate with the holes in plate and guard. As closely as it can be done each hole in the seat is to be surrounded on all sides by holes in plate and guard, and vice versa.

The holes of the seat may e. g. be located like the white squares on a chess board, and those of plate and guard like the corresponding black squares. In small valves this arrangement will sometimes not be feasible, and the one shown in Fig. 1 may be resorted to; here the holes are located on circles, those in the seat alternating with those in plate and guard on the same circle; this is theoretically not quite as good as the chess board arrangement, but still much better than the old method where all the holes of the seat were located on one set of pitch circles, and all the holes of the guard on another set of circles.

Figure 2:
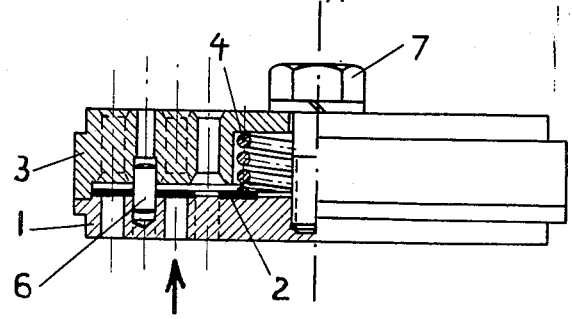

Fig. 2 shows a section through an inventional valve along line A—A of Fig. 1. This valve is primarily intended as a compressor discharge valve; it may, however, be turned around and used as a suction valve, with the only alteration that a countersunk screw head would have to be used; in both cases the flow direction is, of course, as indicated by the arrow. Part 1 is the seat, 2 the plate, 3 the guard, 4 the spring, 6 a guide pin, and 7 the center bolt. Fig. 1 is half a plane view of the plate; the holes shown as full circles are drilled through the plate and through the guard, but not through the seat; crossing center lines indicate the locations where holes are drilled through the seat, but not through plate or guard; the shaded circles indicate guide pins, for which suitable holes are provided in guard, plate, and seat, in the latter, however, these holes must not go through all the way. As mentioned before, all holes are preferably of the same size, with the possible exception of the pin holes, which may be different.

Figure 3:
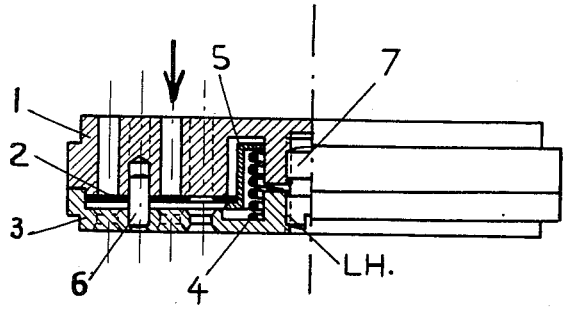

Fig. 3 shows a variation, preferably intended for use as a suction valve. The numerals refer to the corresponding parts as in Fig. 2, 5 indicating the spring cup. In this design the cavity which receives the spring is partially located within the seat, as it is the object of my copending application, Serial #95,049, filed May 24, 1949.

A spring of ample cross section can thus be provided without increasing the thickness of the guard, and the clearance volume on the suction side can thereby be kept at a minimum. The center bolt has a right hand thread on one end, and a left hand thread on the other; thus the parts can be pulled together for assembly without rotating against each other (which is prevented by the guide pins), there is no need for drilling through the seat (which would create a point of possible leakage), nor for a protruding screw head on the face of the guard, and yet the bolt is positively locked and cannot get loose and project into the cylinder.

Figure 4:
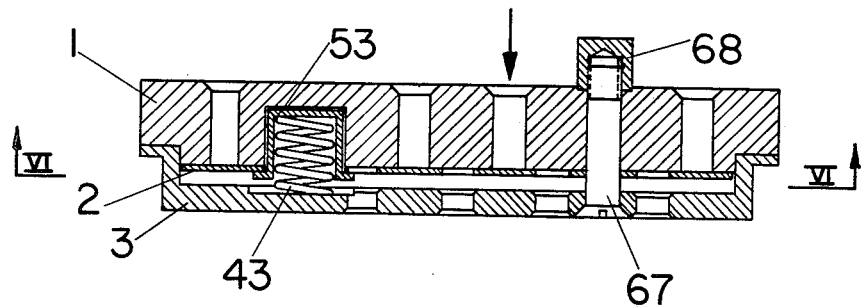
Figure 5:
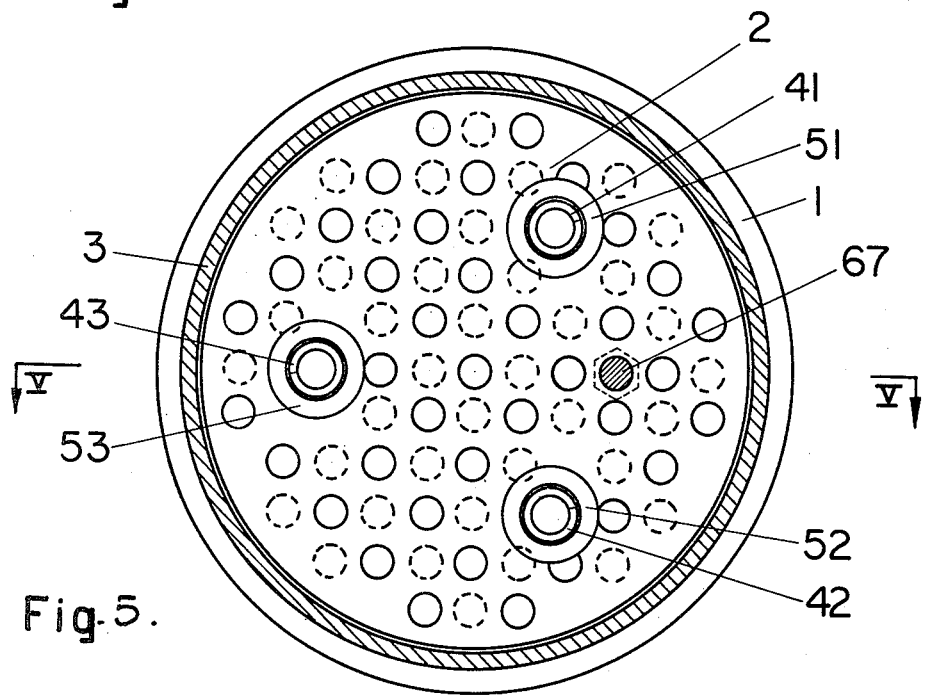

Figures 4 and 5 illustrate a valve in which several springs are used and a few other variations shown. These springs are numbered 41, 42, and 43, and their cups 51, 52, and 53; the bolt 67 is located out of center and serves simultaneously as guide for the plate and means for holding the assembly together; the cap nut 68 forms a gas tight seal on the seat.

The advantages of the invention will be seen from the following discussion. Every valve, like any other structure, must by necessity be a compromise between contradicting demands, e. g. large passage area versus small clearance volume, fast action versus low lifting pressure, low stress in the structural parts, particularly in the springs, versus the first three mentioned demands. While for slow and moderate speeds it presents no serious problem to reconcile these requirements in the conventional design, this becomes increasingly difficult when high speeds are involved. For an efficient compressor operation it is required that the valve close in the time during which the piston travels through a very short distance from the dead center, which for modern high speeds is in the magnitude of a millisecond. This time depends on the valve lift and on the acceleration which is imparted on the plate by the spring, the latter being the quotient of spring load and weight of the plate. In as much as increasing the spring strength inevitably means increasing the force necessary to open the valve, and thus increasing the pressure loss in the gas, there is a limit to this expedient. Consequently the valve plate must not only be made as light as possible, but it becomes also imperative to keep the valve lift very low. E. g., about $\frac{1}{32}''$ lift will result in reasonable values at 1500 R. P. M. for medium pressures and gases of average density, whereas at 3000 R. P. M. a lift of about .012" to .015" will be an acceptable compromise. Heretofore it was usual to provide lifts from about $\frac{3}{32}''$ (in exceptional cases from about $\frac{1}{16}''$) to about $\frac{3}{16}''$ in ring plate valves, and it is impossible to adapt them to the required much smaller lifts for the following reasons.

It is obvious that in a plate valve of the conventional design the slots in seat and guard should be approximately twice as wide as the valve lift in order to provide an approximately uniform passage area through the entire valve. In the following comparison such uniform passage area will be presumed, because if the port area were smaller, then the lift area could not be fully utilized, if it were larger, then unnecessary clearance space would result. Thus for $\frac{1}{32}''$ lift the slots would have to be $\frac{1}{16}''$ wide, and for $\frac{1}{64}''$ lift they should be $\frac{1}{32}''$ wide. So narrow slots, however, would be very difficult and expensive, if not impossible, to make; as a matter of fact, $\frac{1}{32}''$ is about the limit for the usual manufacturing methods, and this only in shallow parts. For the sake of easier manufacturing it is common practice to make the slots somewhat wider than twice the lift; this reduces the attainable lift area, and also increases the clearance volume.

If, instead of slots, holes are drilled in the usual arrangement, the area is reduced considerably. Even if the holes could be spaced so closely together that the sum of all the lands between them at their narrowest points would equal the sum of the widths which would have been provided between slots (which is determined by considerations of structural strength), then still a great deal of area would be wasted because the average width of the land between round holes is naturally much larger than that between the nearest points of their circumference; a geometrical contemplation shows that in the best case round holes will only have $\pi/4$ of the area of arcual slots of equal width, or, in other words, with drilled holes in seat and guard the rings, as well as the gaps between them will have to be $4/\pi$ times as wide as for arcual slots, or fewer rings, and, consequently, less area can be accommodated in a valve of given size.

Quite different considerations prevail for the inventional arrangement. In the first place, as the holes alternate on each circle or on each line, the holes through each piece are spaced so far apart that considerations of manufacture do not enter into the picture at all. Second, in as much as the flow from most of the holes in the seat to most of the holes in the plate takes place in many directions, the circumference of the holes is much better utilized for the gas flow than with the old design where the flow goes only in radial direction. Therefore, the optimum lift of an inventional valve is $\frac{1}{4}$ of the hole diameter, whereas in the old arrangement it would have to be $\pi/8$ of the hole diameter; or for a given lift (which is the decisive factor) the diameter of the holes according to the invention will be $\pi/2$ times as large as for the old design; there will, naturally be fewer holes, but the total resulting area will be larger. Besides, it is, of course, easier and cheaper to drill fewer and larger holes.

The amount of the area increase depends on the ratio of the necessary coverage to the lift, "coverage" meaning the minimum amount by which the plate must overlap the opening in order to ascertain a tight seal. The higher this ratio, in other words, the lower the lift, the greater the net gain. A computation shows that from a ratio of $\frac{3}{4}$ up, which corresponds to lifts from about $\frac{5}{64}''$ down the inventional valves can accommodate more area than even slotted valves.

In the foregoing theoretical comparison it was assumed that the holes could be spaced as required by purely geometrical reasons, i. e. that requirements of manufacture, structural strength, and wear and tear need not be considered. This is, of course, by no means true, and the theoretical maximum cannot be attained either in the old or the inventional valve; actual computations for specific cases, however, have revealed that consideration of these additional factors will change the comparison in favor of the invention.

In the conventional valves the greatest stress occurs obviously in the few radial ribs between the slots and the narrow lands between the holes resp.; to avoid undue deflection seat and guard must, therefore, be of substantial thickness. Such narrow cross sections can entirely be avoided by the invention, the parts can, therefore, be considerably thinner, and the clearance volume thereby reduced and, incidentally, the manufacture facilitated.

The valve plate rests on a large area and has to span only over relatively small and widely spaced holes; it can, therefore, be made thinner and lighter than conventional valve plates, and requires, thus, less spring load.

On the other hand, it must be admitted that the geometrical relations described above prevail accurately only in the middle of the active area, but do not hold true on the boundaries, i. e., on the outer periphery and at the center near the spring well. For this reason the advantages of the invention will be the more outstanding the higher the ratio of valve diameter to lift, or in other words the greater the total number of holes.

Naturally, the lower the lift, the smaller the holes, the greater their number for a given size of valve; this explains why the obtainable area varies only slightly with the lift of the inventional valve, whereas in the old design it decreases rather rapidly when the lift has to be reduced below about $\frac{3}{32}''$. As stated at the beginning, the advantage of the invention will, therefore, chiefly be found in its application for high speed machines.

In certain types of compressors, particularly in vertical single-acting machines, the suction valves are installed within the pistons; springs are often omitted in these valves, and the plates are returned onto the seats through inertia and, in vertical machines, gravity; the influence of the latter is negligible except for very slow machines. It can be shown that as long as the machine runs below a certain critical speed the point where the valve closes depends only on the ratio of valve lift to compressor stroke, and is independent of speed and of weight of the plate. For machines with a short stroke the lift must, therefore, be kept low, even for moderate speeds, and the invention can be applied to advantage to machines of this type. On the other hand, more than one spring may be provided; this may become desirable for very large valves, where they will not detract too much from the available area.

I claim:

1. Automatic non-return valve comprising seat, plate, and guard, seat and guard rigidly connected and facing each other on parallel surfaces, the plate held between them movably in the direction rectangular to these surfaces, all three of said members provided with a plurality of holes of essentially equal size throughout and of essentially equal numbers in each member, those through plate and guard registering with each other but not with those through the seat, and arranged in such a manner that for a substantial number of holes in the seat more than two holes in the plate are nearer than any holes in the seat, and vice versa, said plurality of holes being located on concentric pitch circles, those of the seat alternating with those of the plate on one and the same circle.

2. Automatic non-return valve comprising seat, plate, and guard, seat and guard rigidly connected and facing each other on parallel surfaces, the plate held between them movably in the direction rectangular to these surfaces, all three of said members provided with a plurality of holes of essentially equal size throughout and of essentially equal numbers in each member, those through plate and guard registering with each other but not with those through the seat, and arranged in such a manner that for a substantial number of holes in the seat more than two holes in the plate are nearer than any holes in the seat, and vice versa, said seat and guard being held together by a screw bolt which engages with a right hand thread in one part and with a left hand thread in the other.

References Cited in the file of this patent

UNITED STATES PATENTS

| Number | Name | Date |
|---|---|---|
| 2,035,776 | Voss | Mar. 31, 1936 |
| 2,344,818 | Hutton | Mar. 21, 1944 |

FOREIGN PATENTS

| Number | Country | Date |
|---|---|---|
| 31,638 | Sweden | Oct. 7, 1911 |
| 482,989 | Great Britain | Apr. 8, 1938 |
| 687,507 | Germany | Jan. 31, 1940 |